No. 863,759. PATENTED AUG. 20, 1907.
J. A. RUSSELL.
MEANS FOR PROPELLING VEHICLES.
APPLICATION FILED AUG. 11, 1906.

2 SHEETS—SHEET 1.

No. 863,759. PATENTED AUG. 20, 1907.
J. A. RUSSELL.
MEANS FOR PROPELLING VEHICLES.
APPLICATION FILED AUG. 11, 1906.

2 SHEETS—SHEET 2.

Witnesses

Inventor
John A. Russell
By Milo B. Stevens & Co.
Attorneys

UNITED STATES PATENT OFFICE.

JOHN A. RUSSELL, OF DAVENPORT, IOWA, ASSIGNOR OF ONE-HALF TO EMIL SCHMIDT, OF DAVENPORT, IOWA.

MEANS FOR PROPELLING VEHICLES.

No. 863,759.      Specification of Letters Patent.      Patented Aug. 20, 1907.

Application filed August 11, 1906. Serial No. 330,223.

*To all whom it may concern:*

Be it known that I, JOHN A. RUSSELL, a citizen of the United States, residing at Davenport, in the county of Scott and State of Iowa, have invented new and useful Improvements in Means for Propelling Vehicles, of which the following is a specification.

This invention relates to the propulsion of wheeled vehicles, and is particularly adapted for driving children's carriages.

The object of the invention is to provide improved means for such propulsion, characterized particularly by the fact that there can be no dead center and by the further fact that the power is applied both ways by the operating lever, so that there is no lost motion.

Speaking generally, the propelling devices consist of the lever, and operating pawls which catch on both strokes and turn a master gear wheel which meshes with a pinion on the rear axle and drives the same.

The invention is illustrated in the accompanying drawings, in which

Figure 1:
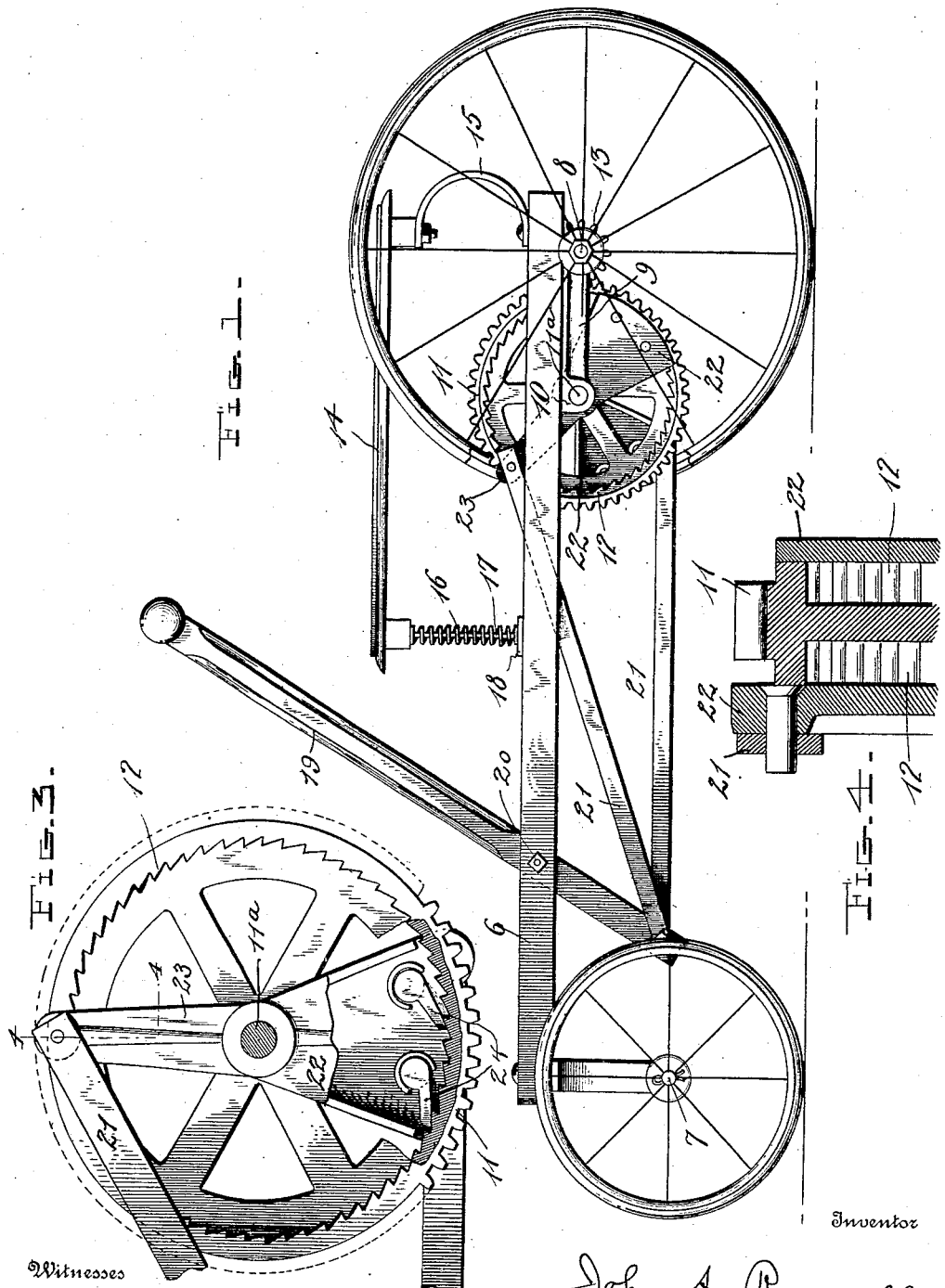
Figure 2:
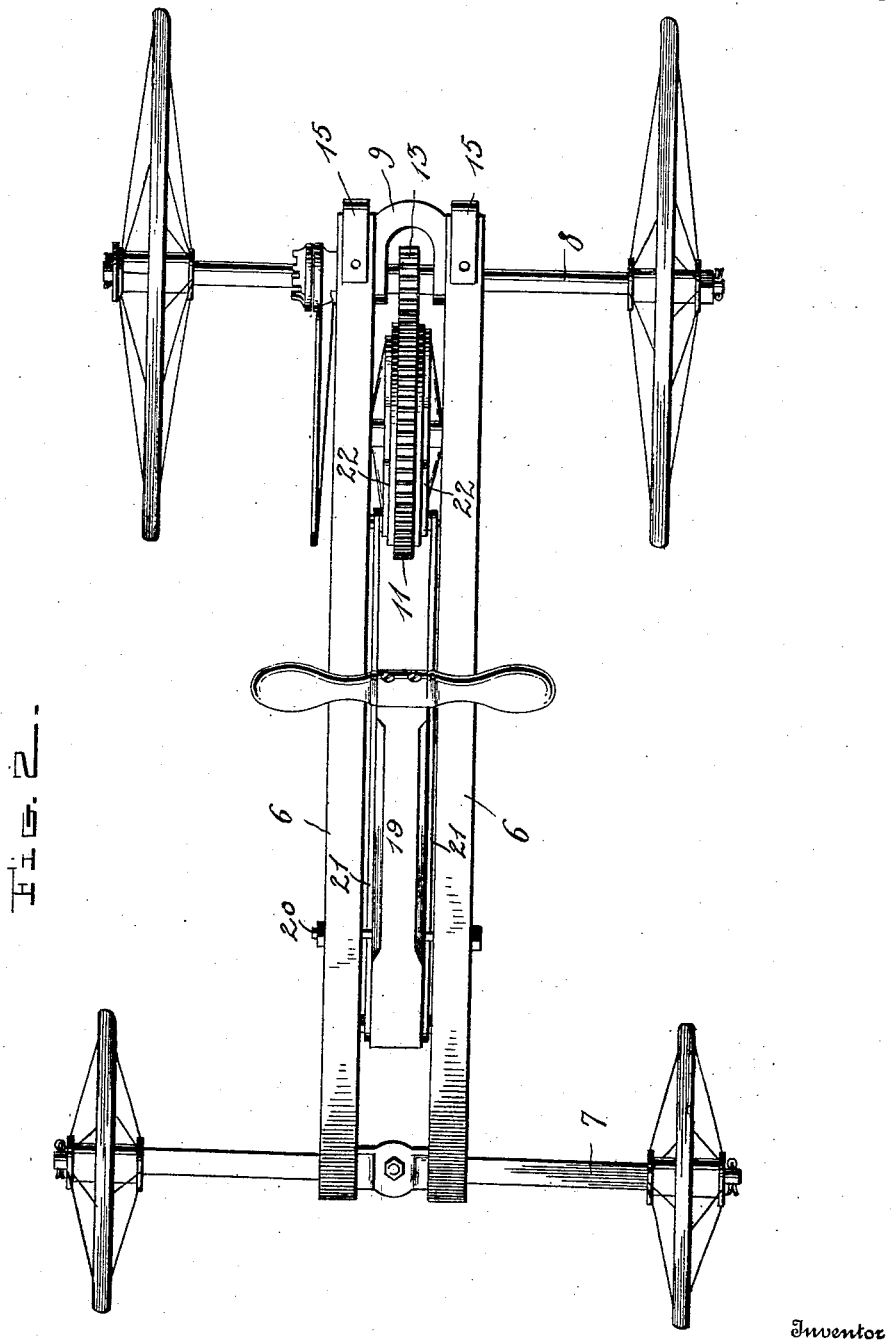

Figure 1 is a side view of a child's carriage provided with the same. Fig. 2 is a plan view, with the seat removed. Fig. 3 is a sectional view illustrating the ratchet wheel and pawl case. Fig. 4 is a detail in section of the ratchet wheel.

The frame of the carriage consists of reach rods 6 mounted upon front and rear axles 7 and 8 which are provided with wheels as usual. One of the rear wheels is fast on its axle and the other is loose. The rear axle is carried in bearings in a U-shaped casting 9 the arms of which are bolted to the under side of the reach rods. At the ends of its opposite branches this casting has bearings 10 for the shaft of the master gear 11. This gear has external spur teeth and also has on each side internal ratchet teeth 12. The spur teeth mesh with a pinion 13 on the rear axle, the pinion being set between the bearing boxes for the rear axle in the branches of the casting.

The reach rods support a seat 14 mounted at the rear end upon two curved springs 15 and at the front end upon a spiral spring 16 coiled around a bolt 17 which works through a hole in a cross piece 18 extending between the reach rods. This provides a comfortable spring seat for the rider.

The operating lever 19 is fulcrumed at 20 between the reach rods, forward of the seat, in position to swing back and forth when operated by the rider on the seat. The lower end of the lever is connected by rods 21 to pawl cases 22 on opposite sides of the wheel 11. These pawl cases are mounted to oscillate upon the shaft $11^a$ of the master wheel 11, and one connecting rod 21 is connected to the pawl case below the shaft and the connecting rod on the opposite side is pivotally connected to an upwardly-extending arm 23 projecting from the pawl case, above the shaft. Consequently the pawl cases swing oppositely. Each case carries a pair of pawls 24 which engage the ratchet teeth of the master wheel. The pawls of each pair are set at a half tooth with respect to each other. That is, when one pawl engages a tooth the other is at halves with another, consequently one or the other pawl will engage with very little slip. This prevents jerks or slips at the beginning of strokes. The opposite arrangement of the connecting rods gives a pull on both strokes of the lever, and since neither pawl case swings beyond center there are no dead centers, but the carriage can be quickly started by either push or pull on the lever. When the lever is swung back and forth it turns the master wheel which by its engagement with the ratchet turns the rear axle and consequently the driving wheel.

I claim:

1. In a carriage, in combination, an axle, a pair of reach rods, a casting connecting and supporting the rear ends of the reach rods and having bearing boxes for the axle and a pair of branches each of which is secured to a reach rod, a pinion on the axle between the branches of the casting, a gear wheel mounted on a shaft between said branches and in mesh with the pinion, and means to turn the gear wheel.

2. In a driving mechanism, the combination with an axle and a wheel shaft, of a wheel on the shaft, geared to the axle and having ratchets on opposite faces, pawl casings mounted to oscillate on the shaft opposite both faces of the wheel, and having pawls engaging the ratchets, one casing having an arm projecting therefrom on the side of the shaft opposite the pawl, and a lever connected to one casing and to the arm of the other casing, the respective connections being on opposite sides of the shaft, so that the casings swing oppositely at each stroke.

3. In a driving mechanism, in combination, a gear wheel having internal ratchets on opposite sides, an oscillating pawl-casing mounted on the shaft of the wheel on each side thereof and having a pawl engaging the ratchets, a lever, and connecting rods between the lever and the casings, the rods being connected to the respective casings on opposite sides of the shaft, so that the casings swing oppositely at each stroke.

In testimony whereof I have signed my name to this specification in the presence of two subscribing witnesses.

JOHN A. RUSSELL.

Witnesses:
     LOUIS BLOCK,
     KATIE MAHAN.